G. MACLOSKIE.
AIR BRAKE SYSTEM.
APPLICATION FILED APR. 8, 1909.

937,452.

Patented Oct. 19, 1909.
2 SHEETS—SHEET 2.

Witnesses:
Marcus L. Byng.
J. Ellis Glen.

Inventor:
George Macloskie,
by Albert G. Davis
Att'y.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

AIR-BRAKE SYSTEM.

937,452. Specification of Letters Patent. Patented Oct. 19, 1909.

Application filed April 8, 1909. Serial No. 488,560.

*To all whom it may concern:*

Be it known that I, GEORGE MACLOSKIE, a citizen of the United States, residing at Schenectady, county of Schenectady, State of New York, have invented certain new and useful Improvements in Air-Brake Systems, of which the following is a specification.

My invention relates to air-brake systems of the type known as "straight-air", comprising a train-pipe through which air flows to and from the brake cylinders in applying and releasing the brakes, and its object is to obtain quicker action in systems of this kind than has heretofore been obtained.

While, in its broader aspects, my invention is applicable to any air-brake system of the "straight-air" type, it is particularly advantageous when applied to what is termed an "emergency straight-air" system of the type disclosed in my prior patents, Nos. 910,402, dated January 19, 1909, and 912,269, dated February 9, 1909. For handling short trains the "straight-air" system possesses advantages over the automatic system in the ease with which the brake cylinder pressure may be controlled, but in its simplest form it has the objection, when applied to trains, of not applying the brakes automatically when the train breaks apart. In the "emergency straight-air" system disclosed in the above-mentioned patents this objection is obviated by employing a train-pipe which normally carries air under pressure, and a valve which operates to apply the brakes only on a sudden fall of pressure in that pipe, such as would occur when the train breaks apart.

By my present invention a "straight-air" system is rendered still more advantageous for use in trains by greatly decreasing the time in which the brakes can be applied and released.

My invention consists in providing an automatic valve mechanism actuated by a flow of air from the straight-air pipe into the brake cylinder, and arranged to establish connections for augmenting the flow of air into the brake cylinder.

My invention further comprises arranging the valve mechanism so that it is responsive to a flow of air in either direction between the straight-air pipe and brake cylinder to augment the flow of air into and out of the brake cylinder.

My invention further comprises other features, which will best be understood by reference to the accompanying drawings, in which—

Figure 1:
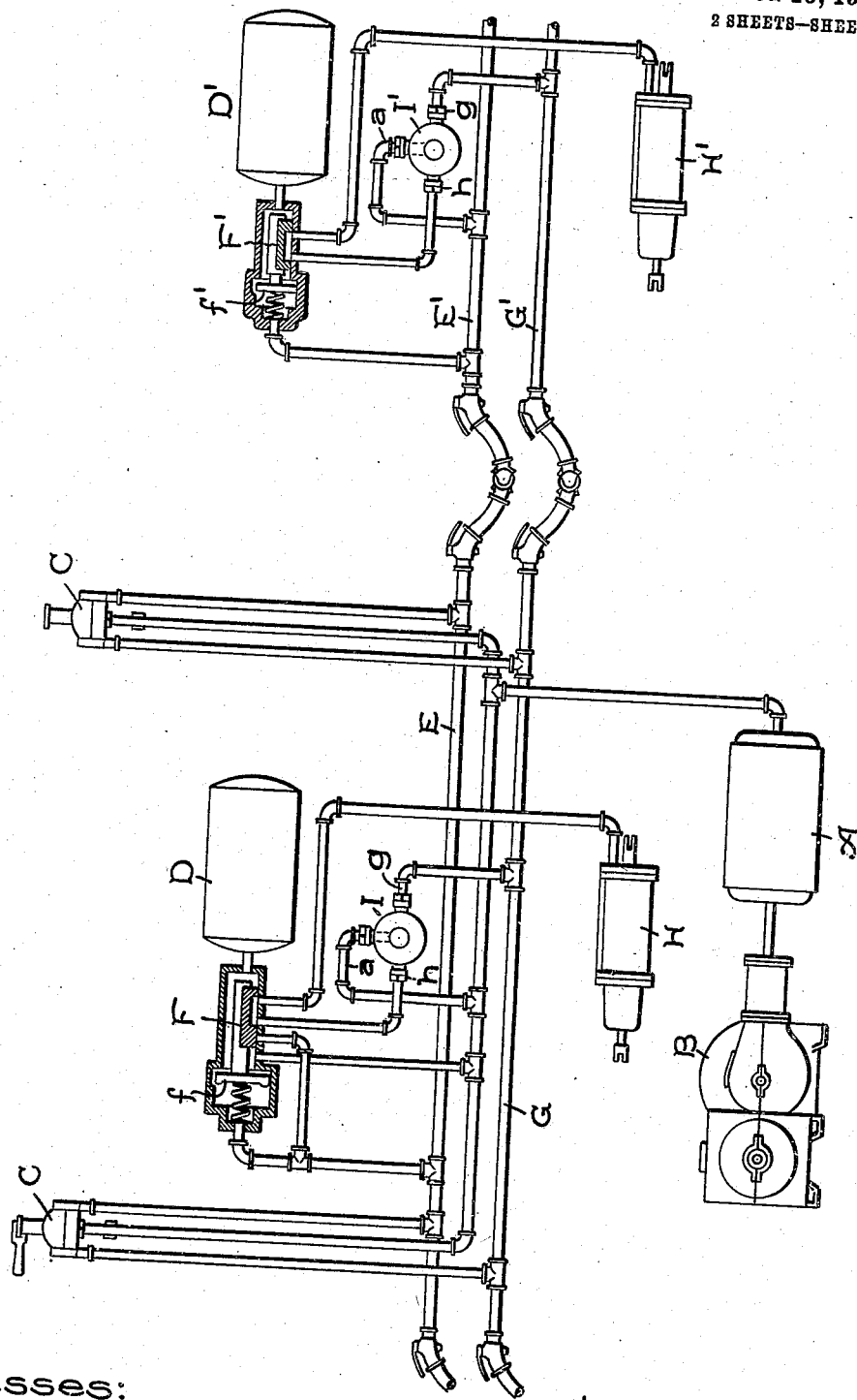
Figure 2:
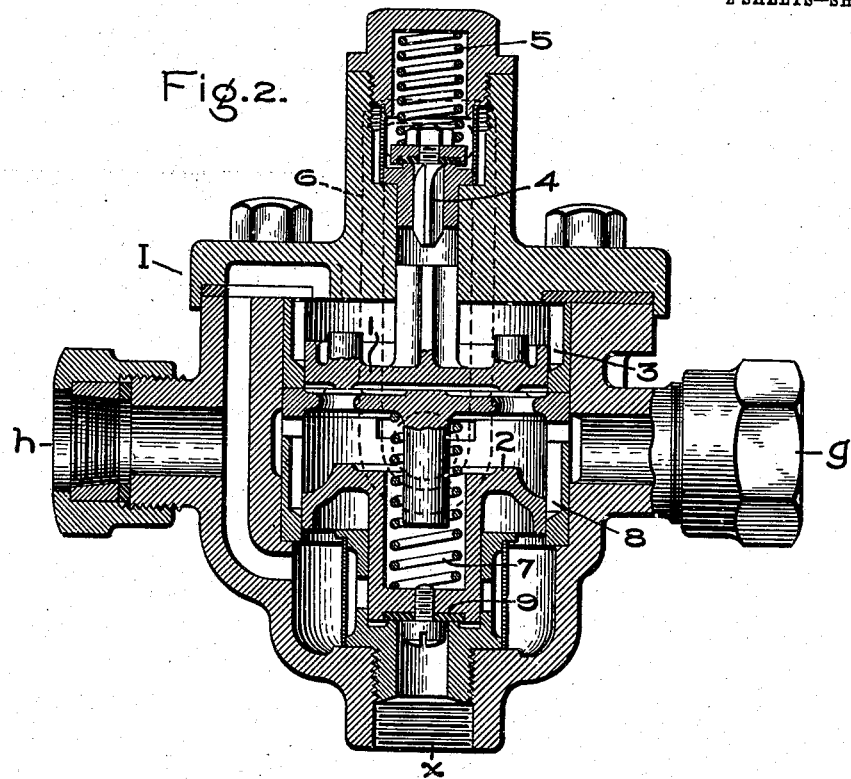

Figure 1 shows diagrammatically an air-brake system arranged in accordance with my invention; Fig. 2 shows a cross-sectional elevation of the automatic valve mechanism; and Fig. 3 shows a plan view of the same.

In Fig. 1, A represents the main reservoir charged by the compressor or air-pump B. To the main reservoir are connected the motorman's valves C C. D represents an auxiliary reservoir, which is normally in connection with and charged from the main reservoir through the casing of the emergency valve F. E represents a train-pipe which normally carries air under pressure and which is charged from the main reservoir through a small passage around the piston $f$ of the emergency valve F. G represents the "straight-air" train-pipe which is connected to main reservoir or to atmosphere by the engineer's valves C for applying and releasing the brakes. H represents the brake cylinder which is connected through normally open ports in the emergency valve F to the connection $h$ of the automatic valve mechanism I. This automatic valve mechanism has two other pipe connections, one of which, $a$, leads to main reservoir, and the other, $g$, to the "straight-air" pipe G. The arrangement of apparatus, thus far described, is that of a motor car and would be duplicated on each motor car of a train. The apparatus at the right-hand in Fig. 1 represents the equipment of a trail-car, in which the parts are lettered as already described, except that the letters are primed. It will be noted that the emergency valve F' of the trail-car is somewhat simpler than the emergency valve of the motor car, while the pipe connection $a$ of the automatic valve I' is connected to the emergency line E', since there is no main reservoir on the trail-car, and since it is desired to keep the air in the auxiliary reservoir D' as a reserve for emergency operation.

Figure 3:
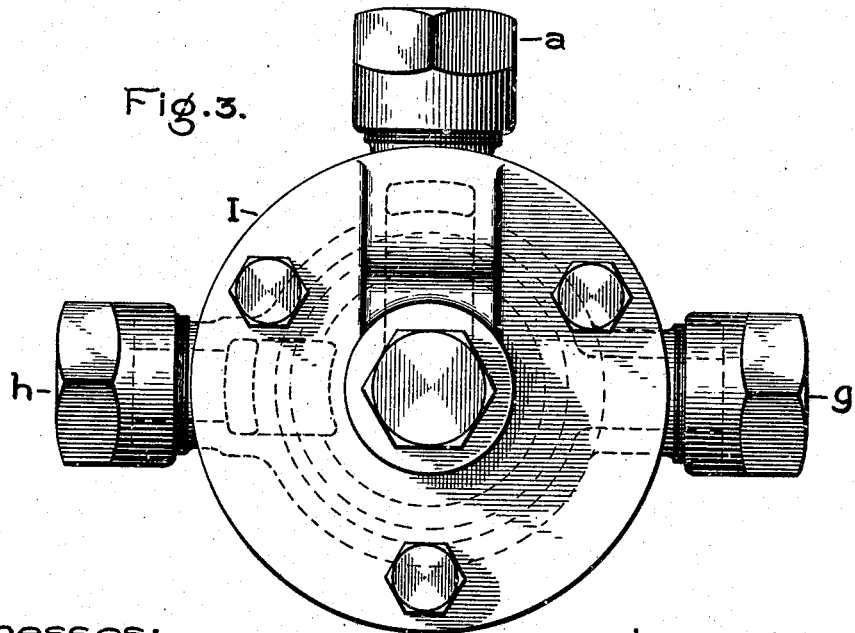

The construction of the automatic valve mechanism I is shown in Figs. 2 and 3. The pipe connection $g$ from the straight-air pipe opens into a chamber between two independently separated and independently movable pistons 1 and 2. The upper side of piston 1 and the lower side of piston 2 are in communication with the pipe connection $h$ leading through the emergency valve to brake cylinder. Since the pressures in brake cylinder and "straight-air" pipe are both normally atmospheric, there is normally no unbalanced air pressure on either piston, so that normally both pistons remain in the position shown. When the brakes are applied, air, entering through the pipe connection $g$, raises the piston 1. This first opens a passage 3 around the piston allowing the air from the "straight-air" pipe to flow into the brake cylinder, and secondly raises the valve 4, which is normally kept seated by a light spring 5. The space above this valve 4 is connected through a passage 6, shown in dotted lines, to the pipe connection $a$, which is in connection with the main reservoir, so that the lifting of valve 4 causes air to flow from main reservoir into brake cylinder, thus augmenting the flow of air from the "straight-air" pipe and giving a quicker application of the brakes than would otherwise be obtained. As soon as the brake cylinder pressure and "straight-air" pipe pressure are equalized, the piston 1 returns to the position shown and valve 4 closes. In releasing the brakes the reduction of air in the straight-air pipe causes an unbalancing of pressure on opposite sides of piston 2, which raises that piston against the pressure of a light spring 7. The upward movement of this piston opens the passage 8 around the piston, permitting air to flow from brake cylinder into the straight-air pipe, and also opens the valve formed by the packing 9 on the lower end of the downward extension of the piston, so as to open a normally closed connection $x$ to atmosphere. The flow of air from the brake cylinder is thus augmented, the greater part escaping directly to atmosphere, so that the time required to release the brakes is decreased. Thus by the use of the automatic mechanism above described the brakes on a train of some length may be operated by the straight-air system in a time not greatly exceeding that required for operating the brakes on a single car.

The construction and operation of the valve mechanism on the trail-car is precisely the same as has already been described, except that, as has heretofore been explained, the air for augmenting the flow into the brake cylinder is taken indirectly from main reservoir through the emergency line.

In normal operation the emergency valves F and F' remain inoperative. If the train should break apart, however, or if the emergency line should be connected to atmosphere by the motorman's valve, the sudden drop in pressure on the left-hand sides of the pistons $f$ and $f'$ would throw those valves to the left. The operation of both valves has the same effect, so far as the operation of the brakes is concerned; that is, the brake cylinders H and H' are disconnected from the valve mechanisms I and I', and are connected to the auxiliary reservoirs D and D', respectively. This is the only function of the valve F'. The valve F on the motor car possesses the further function first of closing the connection leading to main reservoir, and second of connecting emergency line E to the pipe connection $h$ on the automatic valve mechanism I. The emergency line is thus connected to the space on the lower side of piston 2. The pressure in the emergency line raises this piston causing part of the air from the emergency line to flow into the straight air pipe, and part to exhaust directly to atmosphere. By this arrangement a quicker emergency application is obtained than if all the air in the emergency line were forced to escape through the break in the emergency line.

I do not desire to limit myself to the particular construction and arrangement of parts here shown, but aim in the appended claims to cover all modifications which are within the scope of my invention.

What I claim as new and desire to secure by Letters Patent of the United States, is,—

1. In an air-brake system, a "straight-air" train-pipe through which air flows to and from the brake cylinders in applying and releasing the brakes, and automatic valve mechanism actuated by a flow of air from the "straight-air" pipe into the brake cylinder and arranged to establish connections for augmenting the flow of air into the brake cylinder.

2. In an air-brake system, a "straight-air" train-pipe through which air flows to and from the brake cylinders in applying and releasing the brakes, and automatic valve mechanism actuated by a flow of air from the "straight-air" pipe into the brake cylinder and arranged to establish connections from brake cylinder to a source of pressure other than the "straight-air" pipe.

3. In an air-brake system, a "straight-air" pipe through which air flows to and from the brake cylinder in applying and releasing the brakes, and automatic valve mechanism actuated by a flow of air between said pipe and brake cylinder and arranged for establishing connections for augmenting the flow of air into and out of the brake cylinder.

4. In an air-brake system, a "straight-air" pipe through which air flows to and from the brake cylinder in applying and releasing the brakes, and automatic valve mechanism responsive to a flow of air from said pipe to brake cylinder for establishing a connection from brake cylinder to a source of pressure other than said pipe and responsive to a flow of air from brake cylinder to said pipe for establishing a connection to atmosphere independent of said pipe.

5. In an air-brake system, a reservoir in each car, a train-pipe normally carrying air under pressure, a "straight-air" train-pipe through which air flows to and from the brake cylinders in applying and releasing the brakes, automatic valve mechanism actuated by a flow of air from the "straight-air" pipe to brake cylinder and arranged to establish connections for augmenting the flow of air into the brake cylinder, and automatic means for connecting brake cylinder to reservoir upon a sudden fall of pressure in the first-mentioned train-pipe.

6. In an air-brake system, a reservoir on each car, a train-pipe normally carrying air under pressure, a "straight-air" train-pipe through which air flows to and from the brake cylinders in applying and releasing the brakes, automatic valve mechanism actuated by a flow of air from the "straight-air" pipe to brake cylinder and arranged to establish connections for augmenting the flow of air into the brake cylinder, and automatic means for disconnecting brake cylinder from said automatic valve mechanism and connecting it to reservoir upon a sudden fall of pressure in the first-mentioned train-pipe.

7. In an air-brake system, a reservoir on each car, a train-pipe normally carrying air under pressure, a "straight-air" train-pipe through which air flows to and from the brake cylinders in applying and releasing the brakes, automatic valve mechanism actuated by a flow of air from the "straight-air" pipe to brake cylinder and arranged to establish connections from brake cylinder to a source of pressure other than the "straight-air" pipe, and automatic means for connecting brake cylinder to reservoir upon a sudden fall of pressure in the first-mentioned train-pipe.

8. In an air-brake system, a reservoir on each car, a train-pipe normally carrying air under pressure, a "straight-air" train-pipe through which air flows to and from the brake cylinder in applying and releasing the brakes, automatic valve mechanism actuated by a flow of air from the "straight-air" pipe to brake cylinder and arranged to establish connections from brake cylinder to a source of pressure other than the "straight-air" pipe, and automatic means for disconnecting brake cylinder from said valve mechanism and connecting it to reservoir upon a sudden fall of pressure in the first-mentioned train-pipe.

9. In an air-brake system, a reservoir on each car, a train-pipe normally carrying air under pressure, a "straight-air" train-pipe through which air flows to and from the brake cylinders in applying and releasing the brakes, automatic valve mechanism actuated by a flow of air between the "straight-air" pipe and brake cylinder and arranged to establish connections for augmenting the flow of air into and out of brake cylinder, and automatic means for connecting brake cylinder to reservoir upon a sudden fall of pressure in the first mentioned train-pipe.

10. In an air-brake system, a reservoir on each car, a train-pipe normally carrying air under pressure, a "straight-air" train-pipe through which air flows to and from the brake cylinders in applying and releasing the brakes, automatic valve mechanism responsive to a flow of air from the "straight-air" pipe to brake cylinder for establishing a connection from brake cylinder to a source of pressure other than the "straight-air" pipe and responsive to a flow of air from brake cylinder to the "straight-air" pipe for establishing a connection from brake cylinder to atmosphere independent of the "straight-air" pipe, and automatic means for connecting brake cylinder to reservoir upon a sudden fall of pressure in the first-mentioned train-pipe.

11. In an air-brake system, a "straight-air" train-pipe through which air flows to and from the brake cylinders in applying and releasing the brakes, a valve casing, two separately movable abutments therein, a connection from one side of each abutment to said pipe, a connection from the other side of each abutment to brake cylinder, and two valves actuated by the movements of said abutments respectively, one of said valves being arranged to connect brake cylinder to a source of pressure other than said "straight-air" pipe and the other to connect brake cylinder to atmosphere independently of said pipe.

12. In an air-brake system, a "straight-air" train-pipe through which air flows to and from the brake cylinders in applying and releasing the brakes, a valve casing, two separately movable abutments therein, a connection from one side of each abutment to said pipe, a connection from the other side of each abutment to brake cylinder, said casing having a passage around each abutment which passage is opened and closed by the movement of the abutment, and two valves actuated by the movements of said abutments respectively, one of said valves being arranged to connect said brake cylinder to a source of pressure other than said "straight-air" pipe and the other to connect brake cylinder to atmosphere independently of said pipe.

13. In an air-brake system, a reservoir on each car, a train-pipe normally carrying air under pressure, a "straight-air" train-pipe through which air flows to and from the brake cylinder in applying and releasing the brakes, a valve casing, two separately movable abutments therein, a connection from one side of each abutment to the "straight-air" pipe, a connection from the other side of each abutment to brake cylinder, two valves actuated by the movements of said abutments respectively and arranged to connect brake cylinder respectively to a source of pressure other than the "straight-air" pipe and to atmosphere independently of the "straight-air" pipe, and automatic means for connecting brake cylinder to reservoir upon a sudden fall of pressure in the first-mentioned train-pipe.

14. In an air-brake system, a reservoir on each car, a train-pipe normally carrying air under pressure, a "straight-air" train-pipe through which air flows to and from the brake cylinders in applying and releasing the brakes, a valve casing, two separately movable abutments therein, a connection from one side of each abutment to the "straight-air" pipe, a connection from the other side of each abutment to brake cylinder, two valves actuated by the movements of said abutments respectively and arranged to connect brake cylinder respectively to a source of pressure other than the "straight-air" pipe and to atmosphere independently of the "straight-air" pipe, and automatic means for connecting brake cylinder to reservoir upon a sudden fall of pressure in the first-mentioned train-pipe, disconnecting brake cylinder from said abutments, and connecting the first-mentioned train-pipe to said abutments.

In witness whereof, I have hereunto set my hand this 7th day of April, 1909.

GEORGE MACLOSKIE.

Witnesses:
BENJAMIN B. HULL,
HELEN ORFORD.